July 28, 1964  R. J. PETROFF  3,142,521
MACHINE ASSEMBLY SUPPORT
Filed April 30, 1962  4 Sheets-Sheet 1
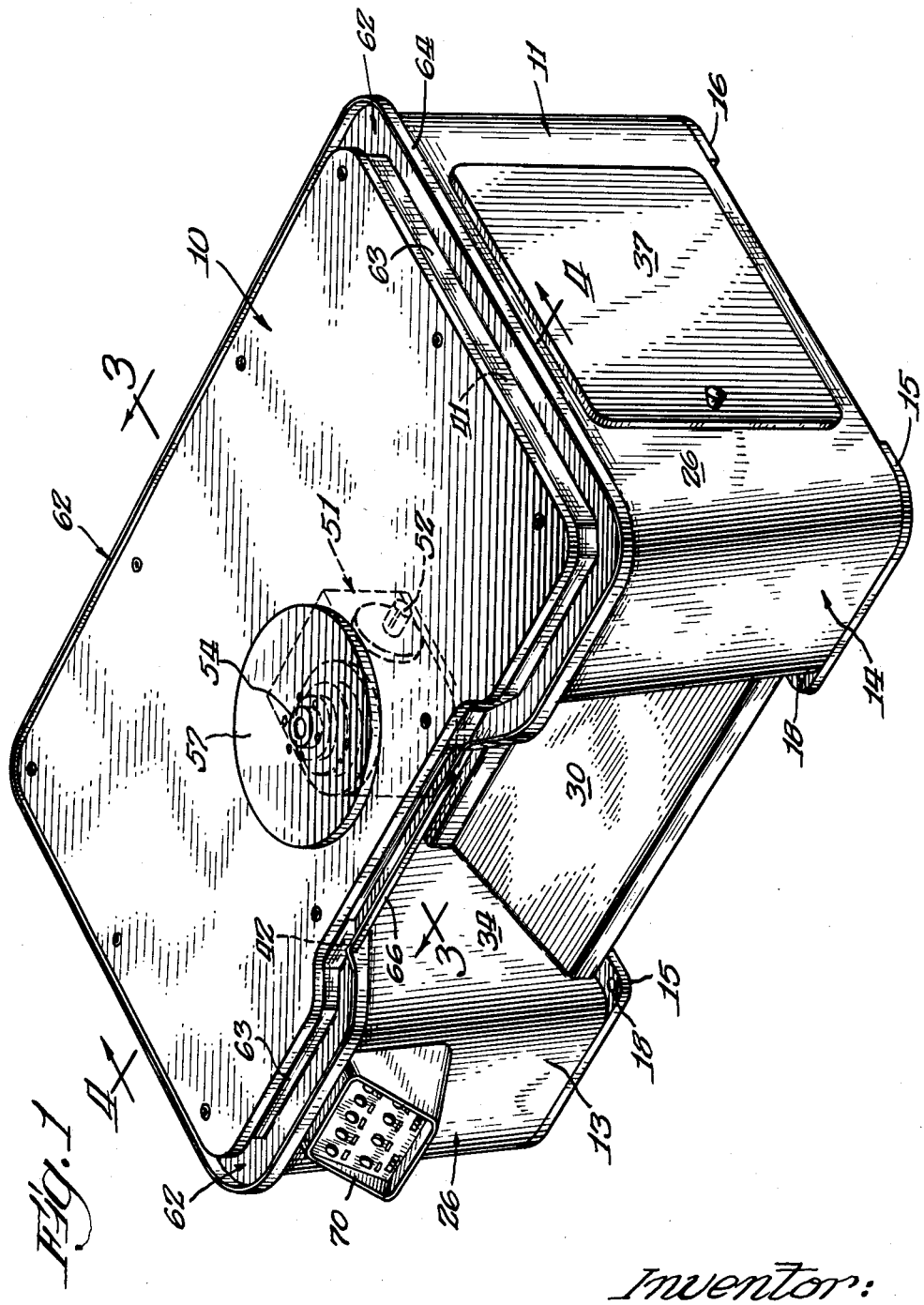
Inventor:
Robert J. Petroff
BY ROBERT L. KAHN  ATTY.

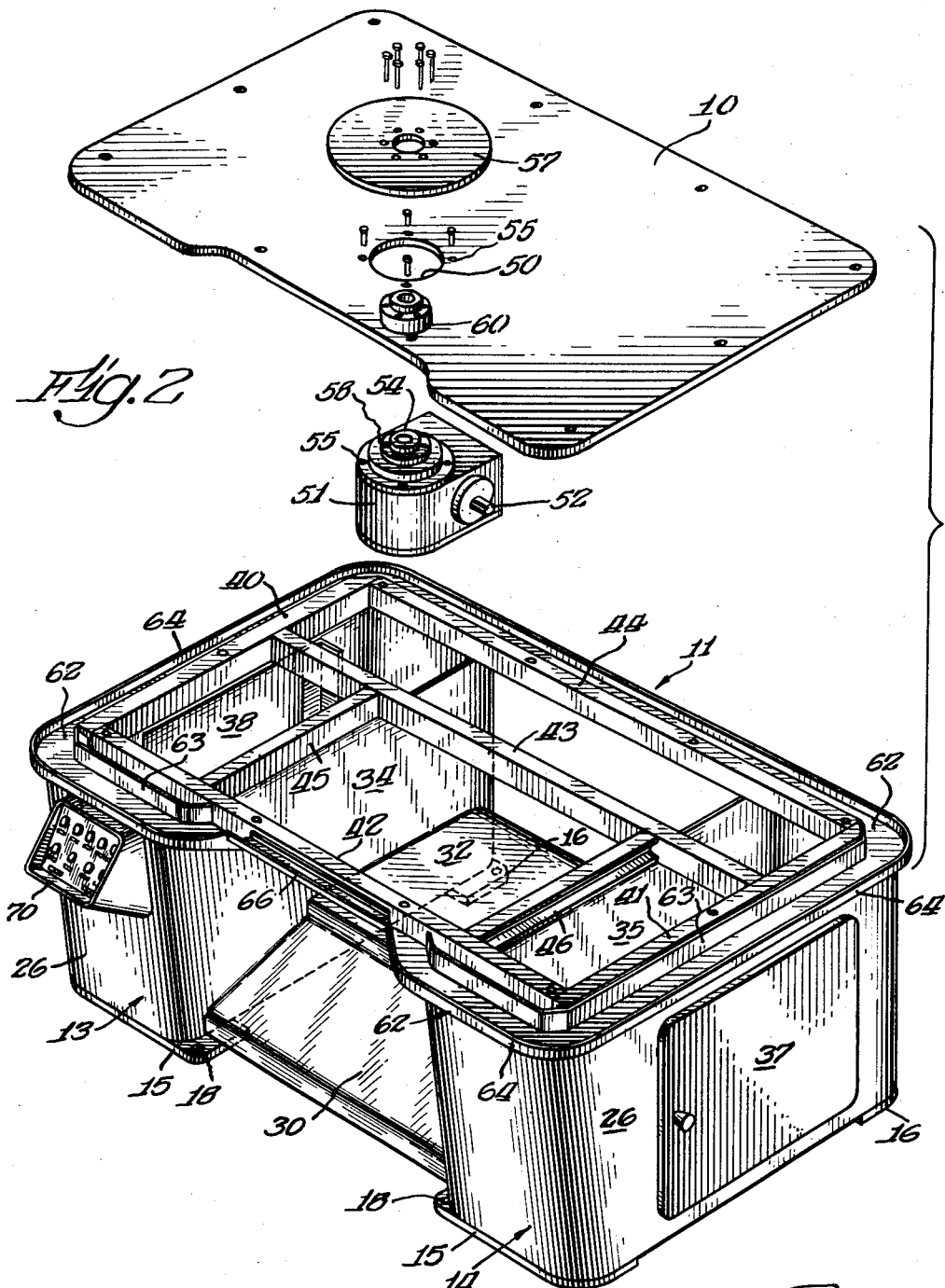

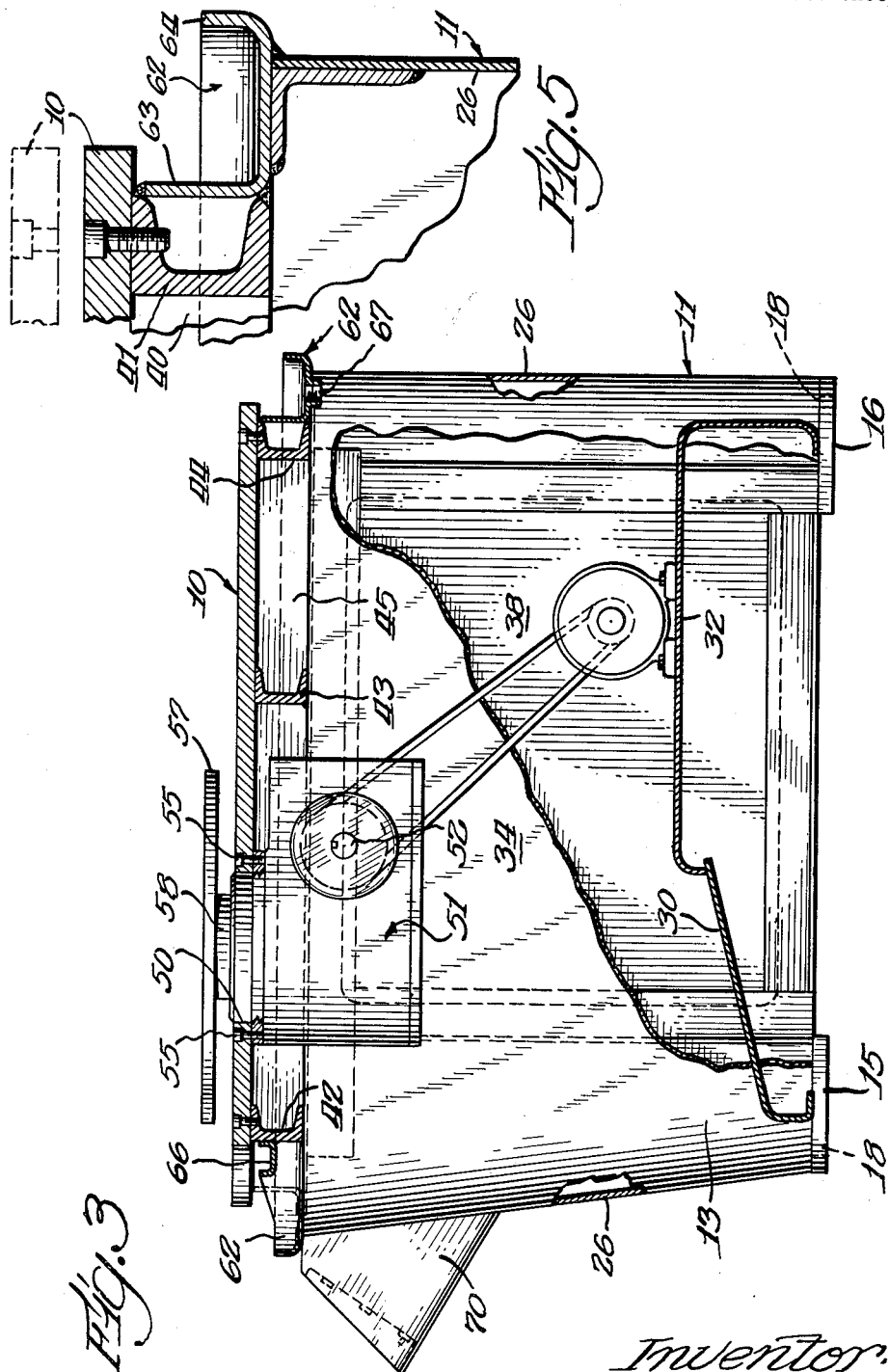

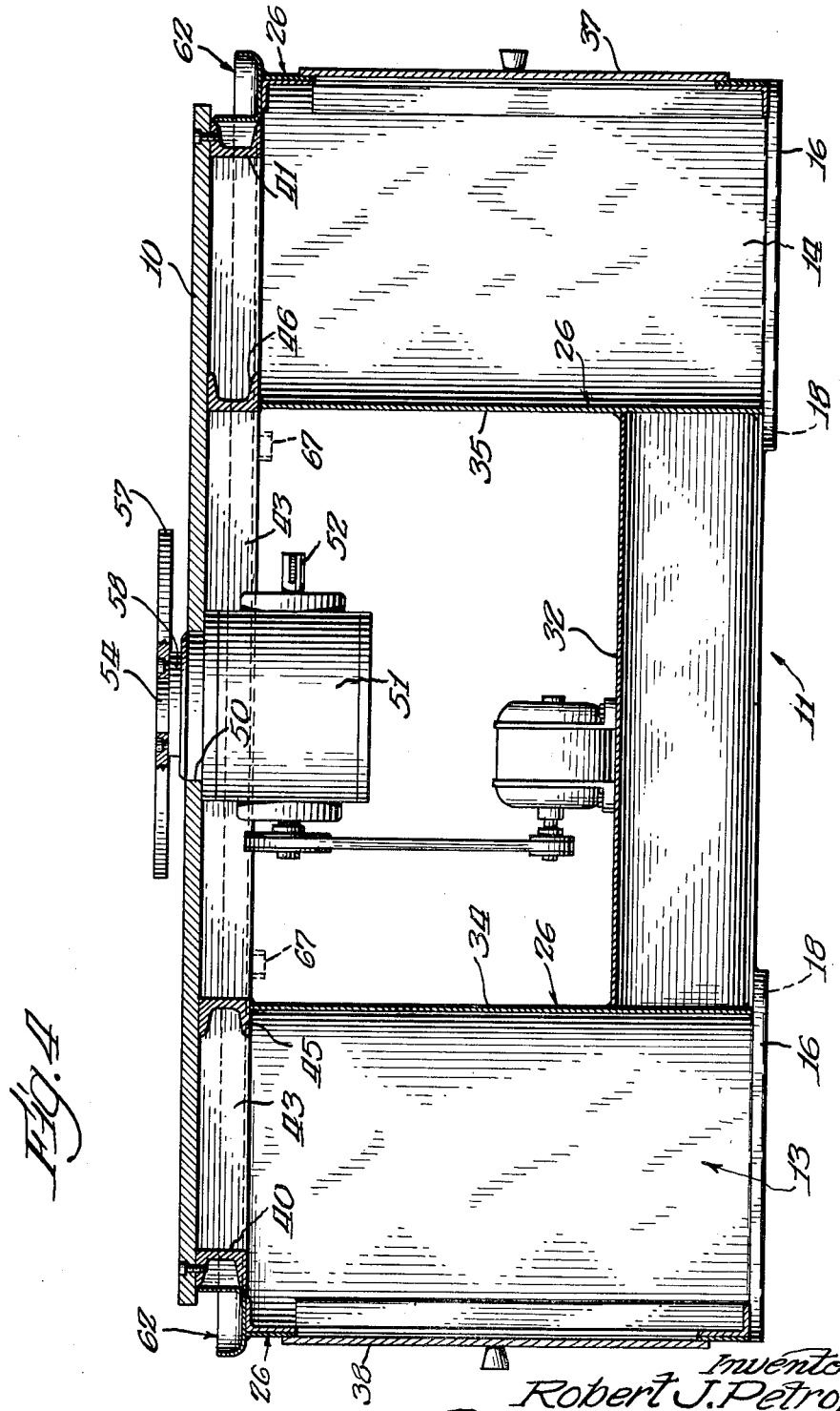

United States Patent Office 3,142,521
Patented July 28, 1964

3,142,521
MACHINE ASSEMBLY SUPPORT
Robert J. Petroff, Lombard, Ill. (% R. Petroff Associates, 5101 W. Lake St., Chicago 44, Ill.)
Filed Apr. 30, 1962, Ser. No. 190,923
1 Claim. (Cl. 312—196)

This invention relates to a machine assembly support, particularly for use in connection with assemblies of small to medium size machinery units. In particular, the invention relates to a base plate and housing upon which may be assembled various machine units such as index means, drill presses, automatic machines of various types, which may be mounted to operate as a group in carrying out certain desired manufacturing operations.

The support forming the subject matter of the present invention is particularly adapted for light machinery which may be assembled in connection with automating equipment or for light manufacturing operation. Thus it is common practice to assemble a number of small machines for working on parts in succession or different parts and assembling the same. In assembling such machines, it is desirable to have a convenient base plate upon which various machines may be assembled and thereafter keep said assembled machines upon said base plate for operating as a manufacturing unit. The plate forming the subject matter of the present invention is prefabricated and pre-machined to satisfactory fine dimensions and provides an accurate level mounting surface upon which various machines may be disposed in desired relative position. In such cases, it is frequently desired to mount machines above and below a base plate and thereafter support the base plate permanently for operating the assemblage of machines.

It has hitherto been customary to assemble various machines on different supports and make a bread-broad assembly for preliminary operation and thereafter reassemble the machines permanently on a massive base for permanent use. This invention provides a convenient means for readily assembling a plurality of machines and permitting such machines to remain in their assembled condition and to function as a manufacturing unit without changing the original assembly of the parts. By providing prefabricated accurately machined mounting surfaces for both the top and bottom faces of a base plate, it is possible to greatly reduce the cost and time of mounting a plurality of separate plates or supports for various machines.

The invention in general provides a rigid, flat finished plate of steel having suitable thickness to permit securing various machines and equipment. This plate is designed to accommodate a number of machines to be mounted thereon above and/or below said plate. By providing accurately finished top and bottom surfaces, said plate makes it possible to proceed with mounting of machines and trying such machines out without going to considerable expense and difficulty in connection with providing accurate relationships between machines. The plate is part of a complete housing upon which the plate can rest. Such support means is sufficiently massive to support the plate with machines. The housing provides sheltered regions within which various machines and accessories may be secured. The support means also makes it possible to provide one or more stations for operators controlling the machines and, in addition, provides means for housing electrical or other accessories usually forming part of a machine assembly.

In order that the invention may be understood, it will be explained in connection with the drawings wherein:

FIGURE 1 is a perspective view of a support plate and housing embodying the present invention.

FIGURE 2 is a view somewhat similar to FIGURE 1 but showing the support plate and index mechanism removed therefrom.

FIGURE 3 is a view with certain parts broken away and certain parts in section along line 3—3 of FIGURE 1.

FIGURE 4 is a view along line 4—4 of FIGURE 1.

FIGURE 5 is a sectional detail.

The invention includes support plate, generally indicated by 10, and housing or cabinet support for the support plate, generally indicated by 11. Housing 11 consists of two generally similar pedestal housings 13 and 14, each provided with front and rear base pads 15 and 16 respectively. These base pads are of steel at least one inch in thickness and are designed to be heavy enough and strong enough so that any unevenness in floors will not result in any bending or deformation of the base pads even under load. Base pads 15 and 16 are provided with bolt holes 18 for bolting to a floor if desired. Each pedestal is formed by about ¼" heavy steel plates 26, which are welded together or rigidly attached and form a complete pedestal.

Pedestals 13 and 14 are rigidly secured together in spaced relation, as illustrated in FIGURES 1 and 2, by step 30 consisting of heavy steel plate about one-quarter of an inch in thickness. Step 30 may extend upwardly and rearwardly from the front of the structure, as illustrated in FIGURES 1 and 2, and the rear portion of step 30 is continued on as shelf 32. Shelf 32 extends toward the rear of the entire structure and the step and shelf are welded to side walls 34 and 35 of the pedestals to form a rigid unitary console structure.

The pedestal housings provide interior spaces, to which access may be obtained by doors 37 and 38. These doors can be opened to give access to switch gear, circuit boxes, fuse boxes and the like, which can be mounted within the pedestals for the purpose of controlling the operation of various electric motors forming part of a complete machine assembly. The housing itself may have conduit or junction boxes secured thereto for providing electric outlets as desired.

The top of pedestals 13 and 14 support channels 40 and 41 extending from the front to the rear of the entire structure and lateral channels 42, 43 and 44 to form rigid skeleton framework. Intermediate supports consisting of channels 45 and 46 are also provided, these extending from the front toward the rear of the structure but spaced from side channels 40 and 41.

The top flanges of channels 40 to 46 inclusive are ground accurately to provide a true horizontal support plane. It is understood that the various channels are rigidly secured to each other, preferably by welding, to provide a strong framework which is rigid and may maintain its relationship under all conditions.

Resting on the top machined surfaces of channels 40 to 46 inclusive is table top 10. This is of heavy steel, preferably at least an inch in thickness but may be thicker or thinner if occasion demands. Table top 10 is preferably of mild steel, so that it may be drilled and cut for disposing various machines in position thereon. Table top 10 has accurately ground parallel top and bottom faces, so that no finishing will be necessary in connection with lining up mountings. Table top 10 may be provided with a number of apertures therethrough along the edges thereof for accommodating bolts to engage suitable tapped recesses in channels 40, 41, 42, 44, 45 and 46. These tapped recesses and the bolts that go into them may serve to anchor the table top on the housing or base. However, this is not essential and the base itself may simply rest upon the housing without any attaching means.

Table top 10 is provided with opening 50 which, in the normal position of the table top, will be just above step 30. Disposed below the table top and rigidly attached thereto is index means 51, which can be driven by shaft 52. Index means 51 may be of the Geneva type or cam type, or any type which is susceptible to a mounting permitting the index means to depend from the bottom face of table top 10. Index means 51 has vertical shaft 54, which is preferably hollow, for the full length thereof and the index means may be bolted at 55 to table top 10 by bolts as illustrated in FIGURE 2. Index plate 57 is also bolted to part 58 of the index means, this part rotating with the shaft and being adapted to be indexed to various predetermined positions.

If index table 57 is to be elevated above the index means and above the top surface of table 10 by a distance greater than provided for by the index means, extension 60 is provided for accommodating the bolts for attaching the index table to the index means and thus elevate the index plate or table any desired amount above the surface of table 10. Index means 51 may be provided with suitable graduations for selecting desired index positions.

Shaft 52 of the index means may be manually turned or may be operated by having a pulley thereon and driven from an electric motor which may be disposed on step 30 or shelf 32, or any other desired part of the support.

The hollow shaft indicated by 54 makes it possible to feed air, oil or any other material axially from below the table up into whatever mechanism is being operated upon or this hollow region may accommodate rods such as push rods or the like, as desired.

The edge of the table is just above a trough which is disposed peripherally of the entire structure. This trough, generally indicated by 62, consists of a channel-shaped piece of metal having inner wall 63 substantially wider than outer wall 64. Inner wall 63 is welded to the edges of the flanges of the channels or to the web of the channel, depending upon which is convenient and available. Trough 62 extends around all of the table except at the front of the housing where the trough curves inwardly and merges into trough 66, which extends along the outside of channel 42.

Trough 66 is welded to trough 62 and the function of the trough arrangement is to collect oil or cutting fluids which may be used in connection with the operation of a machine assembly which may be disposed upon table 10. Preferably, trough 62 and trough 66 may be pitched so that at the rear of the housing, or at any other desired spot, liquid which may be in the trough will tend to flow and drain from the trough at nipple 67. A suitable hose can be connected to nipple 67 and may drain the liquid to a pump or any other suitable means which may dispose of the liquid or return the liquid for use by any machines requiring the same. The trough may also be used for catching metal shavings or the like, which may be generated by operating any machines which may be supported upon table 10.

The peripheral trough is preferably heavy enough so that a strong reenforcing effect is created for the housing. Thus the trough will endow the structure with substantial rigidity.

Control panel 70 is secured to one of the pedestals, such as 13. Control panel 70 may have suitable manual switches and the like for starting or stopping electric motors or other devices in connection with using the machines which may be carried by table 10. As has been pointed out, table 10 is preferably of mild steel so that it may be drilled, tapped or cut to permit mounting various machines and devices. The finished surface at both the top and bottom faces of table 10 will make it possible to provide accurate mountings for any desired machine elements. The index means may be used to operate in conjunction with other desired pieces of machinery. The prepositioning of the index means below the table makes it possible to service the index means readily without disturbing other machines. Thus a compact and closely knit assembly of machines is possible without sacrificing accessibility, and convenience.

A decided advantage of the present construction resides in the fact that table 10 is sufficiently heavy so that it can be used as a table upon which machines and various things may be mounted or secured while the table top itself is free of the housing and is temporarily supported. Thus the various machines to be mounted on both sides of the table top may be handled while the table is out in the open removed from its housing support, with the top and bottom of the table top freely accessible. The accuracy of the table top faces is such that no heavy work will be involved while various machines are being secured. Once everything is assembled on table top 10, the entire table top with machines and the like, including machines on both sides, may be removed and disposed over the housing and support, as illustrated in FIGURE 2.

If necessary, the inside walls of the pedestals may have suitable windows cut therethrough to give access as desired. The entire construction provides a convenient base or support upon which desired machines or units may be disposed for any desired operation. The housing construction provides a large accessible region below the table top. Thus a complete console may be created without inconvenience and may be assembled at any desired spot and moved to the place of use. In the event that any repairs are to be made to any machines, table top 10, together with the machine elements supported thereby, may be raised and transported to a repair shop. The accessible regions below the table top and between pedestals makes for easy inspection and servicing both below and above the table top. Insofar as any parts mounted in a housing are concerned, such as an electric motor, it may be advisable to have flexible detachable means such as belts for connecting a motor with the load. Thus in the event that table top 10 and its parts are to be moved, it will not be necessary to unbolt the electric motor from step 30 or shelf 32 if it happens to be mounted thereon.

It is possible to secure an electric motor on the bottom of table top 10. However, it will be necessary to provide detachable or disconnect couplings for electricity, air, liquid, or any other desired material that may be supplied to the equipment carried by table top 10. In general, however, such couplings may be disconnected easily and do not require any accuracy with regard to assembling or disassembling. The real accuracy has already been built into the base table and support and the expense usually involved in making makeshift amounts for machines and the like will be entirely eliminated. In particular, the bottom mounted index means capable of handling work above the table top endows a machinery console with flexibility and accessibility, as well as versatility for accommodating many and diverse machines for mounting in close quarters.

The entire housing and table top provides a console which may be carried on castors disposed below pads 15 and 16. The skeleton structure is sufficiently rigid and massive so that even though the entire weight of the housing, table top and machines is carried on, say eight or more castors, nevertheless the trueness of table top 10 and whatever is assembled thereon will not be impaired. It is understood that table top 10 may be made as thick as desired and may be made of any suitable material. Thus it may be desirable for certain special purposes to make table top 10 out of non-ferrous material, stainless steel or special alloys.

The table top with its contents may be rigidly secured in position or may rest loosely upon the top of the entire base and housing and will furnish a convenient nucleus for assembling, using and maintaining a work console consisting of any desired number of machines or machine elements. The size of the table top may vary within wide limits. As a rule, a size of about 6 feet by 4 feet is capable of a wide variety of uses for many light manufacturing operations. However, table tops and supporting structures may be made much larger or smaller than the above size.

What is claimed is:

A steel console for supporting metal working units in desired relationship, said console comprising two laterally spaced box-like steel pedestals having side walls and open tops, a generally horizontal steel step plate extending between opposed pedestal sides and rigidly joined thereto near the bottom thereof, a skeleton steel channel frame rigidly secured to the pedestal tops, said frame having the top surfaces thereof finished to define an accurate support plane which is horizontal in the normal position of the console, means defining a drain trough laterally beyond and below the level of the top surfaces of the channel frame, a flat steel table plate large enough to rest upon the channel frame, said table plate being of mild steel and having accurately finished flat, parallel top and bottom surfaces and having the plate edges thereof just above the trough so that waste and liquid on top of said table plate can be readily disposed of by dropping into the trough, said table plate having a minimum thickness of the order of about one inch and the pedestals, channel frame and step plate being heavy enough to provide a rigid support for said table plate with said channel frame providing support for said table plate along spaced regions so that said table plate is strongly supported but has its bottom finished surface largely accessible for mounting metal working units as desired, said table plate steel permitting cutting, drilling or tapping for mounting metal working units on top or bottom surfaces as desired, index means carried by said table plate and including an index plate disposed above the top surface of said table plate at an intermediate part thereof and including a shaft extending through said table plate, an electric motor carried by said step for driving said shaft, said pedestals having side doors giving access to the interiors thereof whereby said console may function as the nucleus for a plurality of metal work units and provide a desired number of work stations about said index table, said table plate surfaces being accurate enough so that metal work units may be positioned thereon with the accuracy required in metal working operations without further finishing operations on said table plate surfaces, the parallelism of said table plate surfaces insuring correct relationship between various metal working units and index means.

References Cited in the file of this patent

UNITED STATES PATENTS

| | | |
|---|---|---|
| D. 118,930 | Frushour | Feb. 13, 1940 |
| 401,820 | Dahlstrom | Apr. 23, 1889 |
| 432,356 | Beck | July 15, 1890 |
| 1,873,932 | Hunter | Aug. 23, 1932 |
| 2,115,239 | Strain | Apr. 26, 1938 |
| 2,229,046 | Carson | Jan. 21, 1941 |
| 2,362,757 | Lang | Nov. 14, 1944 |
| 2,490,649 | Polis | Dec. 6, 1949 |
| 2,916,233 | Ecker | Dec. 8, 1959 |